ROBERT E. GOOLSBY
DONALD E. YOUNT
INVENTORS

BY
Robert K. Rhea
AGENT

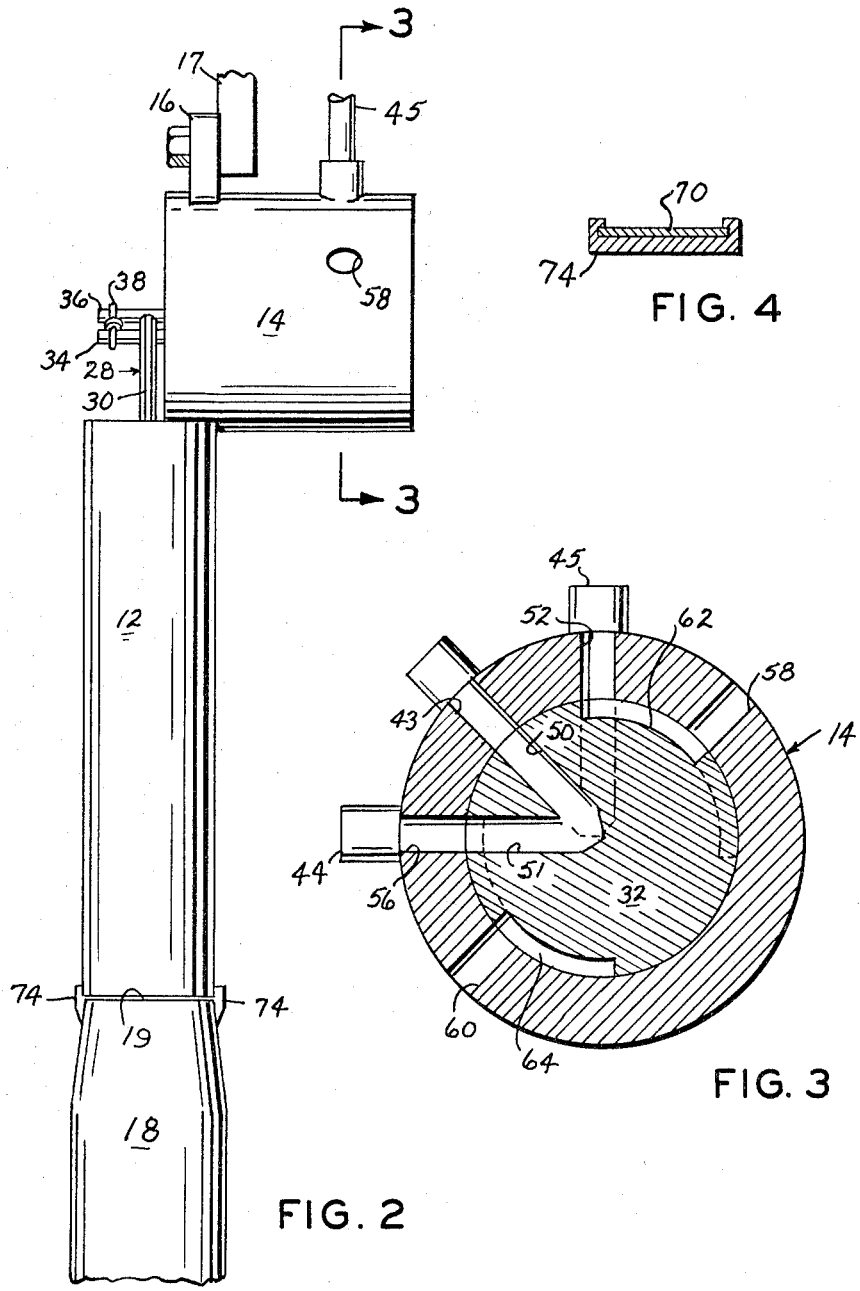

United States Patent Office 3,274,957
Patented Sept. 27, 1966

1

3,274,957
HAY WAFER REGULATOR
Robert E. Goolsby, 701 S. Harvard, Perryton, Tex., and
Donald E. Yount, Perryton, Tex. (1816 7th Ave.,
Greeley, Colo. 80631)
Filed May 3, 1962, Ser. No. 192,257
8 Claims. (Cl. 107—14)

The present invention relates to harvesters and more particularly to a hay wafering machine.

Hay wafering machines compact hay, such as alfalfa or clover, into a series of dies by the use of a wheel equipped rotating shaft and compression chamber so that the centrifugal force generated by the rotating shaft and wheels forces the hay into a series of wafer forming dies. The tightly compressed hay or wafer emerges in a continuous length from the ejection end of the dies. One type of such wafering machine includes a series of flanges, one for each die, which break the continuous stream of compressed hay emerging from the dies so that the compressed hay is broken into sections or wafers of irregular length. This means of severing the wafered hay into such lengths results, in many instances, of a tendency of the compressed hay to ravel or fray at the respective ends of each wafer.

It is, therefore, the principal object of the instant invention to provide a hay wafer length control device by which hay wafers are formed of uniform lengths.

Another object is to provide a hay wafer length control means which is automatically operated to sever the compressed hay by the amount of hay compacted within the die.

Still another object is to provide a device of this class which will form hay wafers of selected lengths.

Still another object is to provide a wafer length regulator which may be easily connected to a conventional hay wafering machine and which is actuated by hydraulic or air pressure.

A further object is to provide a device of this class which includes a control valve which is moved to wafer severing position and returned to a position coaxial with the hay wafering die by the movement of the wafer into and out of the device.

The present invention accomplishes these and other objects by mounting a tubular member and valve means adjacent the ejection end of a hay wafering die wherein spring means within the device actuates the valve for moving the device to a hay wafer severing position.

Other objects will be apparent from the following description when taken in conjunction with the accompanying two sheets of drawings, wherein:

FIGURE 2 is a side elevational view of the device seen in FIG. 1;

FIGURE 3 is a vertical cross-sectional view taken substantially along the line 3—3 of FIG. 2; and, FIGURE 4 is a vertical cross-sectional view taken substantially along the line 4—4 of FIG. 1.

Like characters of reference designate like parts in those figures of the drawings in which they occur.

2

Figure 1:
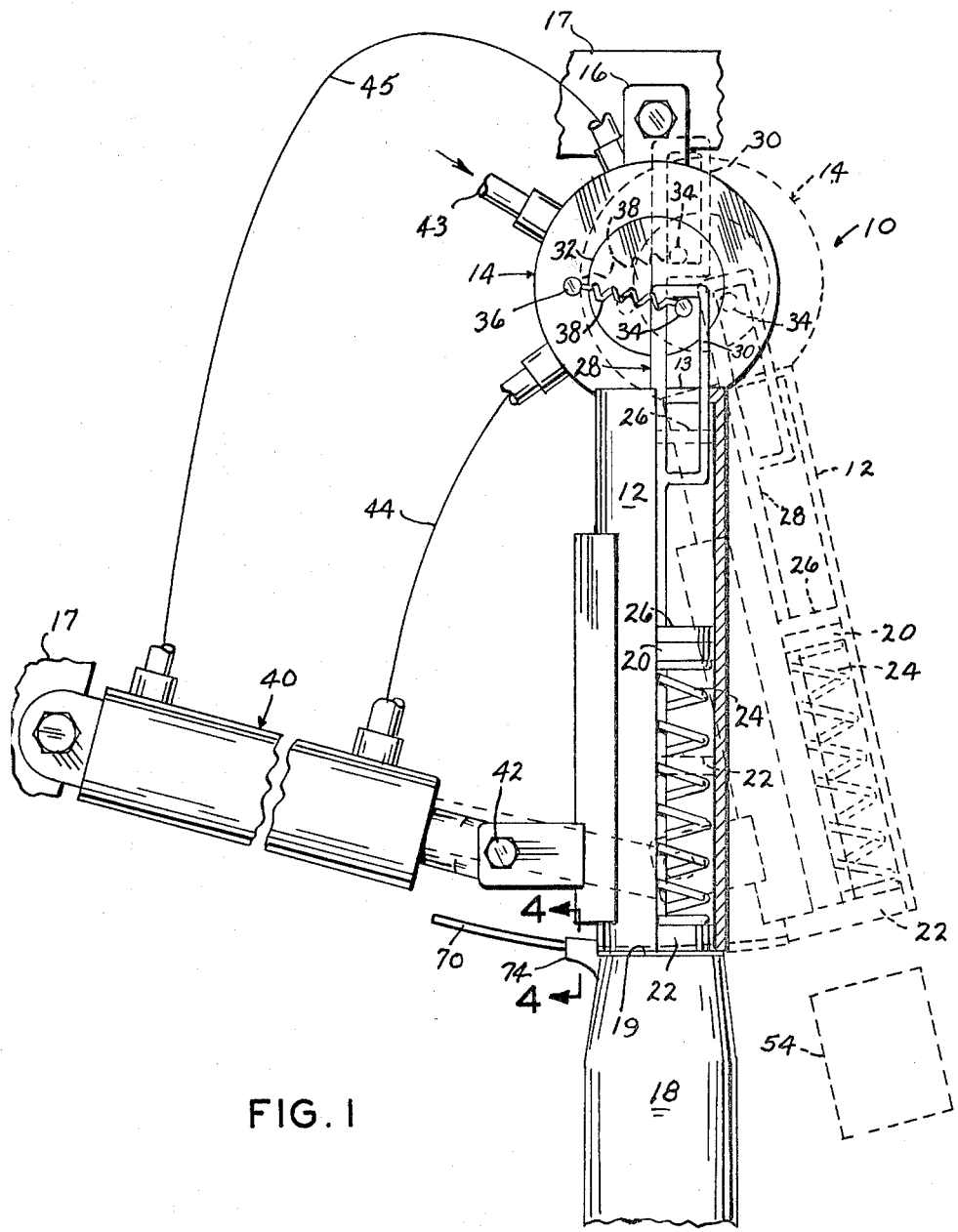
FIGURE 1 is an elevational view, partly in section, of the device in operative position and illustrating, by dotted lines, its relative position when ejecting a hay wafer.

In the drawings:

The reference numeral 10 indicates the device, as a whole, comprising a tubular body 12 of a selected length which is connected at one radially slotted closed end 13 with the body of a cylindrically shaped control valve 14 which is in turn pivotally connected by an ear 16 with the frame 17 of a forage harvester. The depending free end of the body 12 is coaxially aligned with the ejection end of a hay wafering die 18. The hay wafering die 18 is conventional and compresses and compacts hay forced into it by the centrifugal force generated by a roller equipped rotating shaft, not shown. Diametrically the body 12 is equal to the diameter of the ejection end 19 of the die.

A centrally apertured disk or partition 20 is secured to the wall forming the bore of the body 12 intermediate its ends. A control rod 28 extends axially through the body 12 and the apertures in the partition 20 and body end 13. A plate 22 is slidably received by the open end of the body 12 and axially connected to the rod 28. A helical spring 24 is interposed between the disk 20 and plate 22. A disk 26 is rigidly secured axially to the control rod 28 adjacent the partition 20 when the rod 28 is in the position shown by solid lines (FIG. 1). The control rod 28 projects outwardly beyond the closed end 13 and is turned back upon itself through the opening in the end 13 to form a loop 30 of a selected length.

The valve 14 includes a central rotatable core 32 having an off-center outwardly projecting pin 34 positioned within the control rod loop 30. A similar pin 36, secured to the valve body is interconnected with the pin 34 by a spring 38. The function of the spring 38 is to quickly rotate the valve core 32 to a wafer ejecting position in a manner more fully described hereinbelow.

A conventional air cylinder 40 is connected at one end to the harvester body 17 and pivotally connected by the free end portion of its shaft or piston to the body 12, as at 42. An air pressure line 43, connected with a supply of compressed air, not shown, is connected with the body of the valve 14. Flexible hose, indicated by the lines 44 and 45, interconnect the respective ends of the air cylinder 40 to the body of the valve 14 for pivoting the body 12 and positioning the free end of the latter outwardly of the die 18, as shown by dotted lines (FIG. 1).

*Operation*

In operation hay, not shown, is forced out of the upper end of the die 18 into the body 12 against the plate 22 compressing the spring 24 and moving the control rod 28 and loop 30 upwardly, as shown by dotted lines (FIG. 1). The bottom portion of the loop 30 contacts the pin 34 and rotates the valve core 32 to align one leg 50 of a V-shaped port in the valve core 32 with a port 52 in the valve body connected with the line 45. The other leg 51 of the V-shaped port is simultaneously aligned with the air supply line 43. This actuates or extends the shaft of the air cylinder 40 and pivots the free end of the body 12 laterally of the die 18, as shown by dotted lines (FIG. 1), thus severing the compressed hay into a wafer 54 of a desired length. The spring 24 expands and the plate 22 ejects the wafer 54 out of the open end of the body 12. Expansion of the spring 24 is limited by the contact of the disk 26 with the partition 20 and such expansive movement of the spring 24 lowers the control rod loop 30 to contact the pin 34 and rotate the valve core 32 to interrupt the supply of air to the line 45 by aligning the port 51 with a port 56 in the valve body in communication with the line 44 while simultaneously positioning the port 50 in communication with the air supply line 43. This retracts the shaft of the cylinder 40 which repositions the body 12 coaxially over the ejection end of the die 18. Compressed air within the cylinder 40 is exhausted from the respective inactivated line 44 and 45 through exhaust ports 58 and 60, respectively, communicating with the respective ports 52 and 56 by slots or channels 62 and 64, respectively, formed in the periphery of the valve core 32.

While the body 12 is discharging the wafer 54, a laterally extending die closing plate 70, connected to an outer peripheral portion of the free end of the body 12, is positioned over the open end of the die to contain the compressed hay therein. A guide and stop 74, secured to a peripheral portion of the free end portion of the die 18, overlaps opposing side edges of the die closing plate 70 for sliding movement of the plate 70 and maintaining the free end portion of the latter in closing contact with the die 18 while the hay wafer 54 is being discharged. The wafer severing and ejecting action is accomplished quickly requiring a time lapse of only two or three seconds.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A hay wafer length control device for connection with a hay wafering machine having a hay wafer forming die, comprising: a tubular body, a control valve connected to one end of said tubular body, said valve having a valve control pin; an ear on said valve pivotally connecting said valve to said machine with said body coaxially aligned with said die; a centrally apertured partition within said body; a control rod axially disposed within said body through the aperture in said partition, said control rod projecting beyond the end of said body toward said valve; a loop formed on the outwardly projecting end portion of said control rod and loosely surrounding said valve control pin; a plate axially connected to said control rod within the end portion of said body adjacent said die; a pressure operated cylinder pivotally connected at one end to said machine, said cylinder having an extendable piston shaft pivotally connected by its free end to the end of said body adjacent said die; tubing interconnecting said control valve and said cylinder with a source of pressure, whereby hay forced into said body from said die moves said control rod in one direction to open said valve and extend said piston shaft to move said body away from said die; and spring means within said body between said partition and said plate for moving said control rod in the opposite direction, closing said valve, retracting said piston shaft and returning said body to hay wafer receiving position.

2. A hay wafer regulator for connection with a hay wafering machine having a hay compressing die, said die having an open ejection end, comprising: a tubular body pivotally connected at one end to the said machine in coaxial alignment with the open end of said die; a control rod within said body and projecting outwardly beyond the end of said body opposite said die; spring and disk means surrounding said control rod within said body, said spring and disk means actuated to move said control rod longitudinally of said body and compress said spring by movement of hay into said body; a pressure cylinder connected at one end to said machine, said cylinder having an extendable shaft connected to the end portion of said body adjacent said die; and valve means connected with said cylinder and controlled by the outwardly projecting end portion of said control rod for actuating said cylinder for pivoting one end of said body laterally of said die, permitting expansion of said spring and ejecting the hay wafer out of said body.

3. Structure as specified in claim 2 in which the spring and disk means includes a centrally apertured partition within said body, a pressure plate secured to said control rod and slidably disposed in the end portion of said body adjacent said die, a disk axially connected with said control rod adjacent said partition opposite said plate, and a helical spring interposed between said partition and said pressure plate around said control rod.

4. Structure as specified in claim 2 in which the valve means includes a control valve mounted on said tubular body and connected with a supply of air under pressure, said control valve having a valve control pin, flexible tubing connecting said cylinder with said control valve, and a loop formed on the free end portion of said control rod in contact with said valve control pin for opening and closing said control valve and actuating said cylinder in response to movement of hay into and out of the end of said body adjacent said die.

5. Structure as specified in claim 4 and a laterally extending die plate connected with the free end of said body and slidably connected with the free end of said die for closing the open end of the latter while the wafer is being ejected from said body.

6. In a forage harvester having a hay wafer forming die and means for forcing hay into and out of the die by centrifugal force, an improvement, comprising: a tubular body pivotally connected at one end to the harvester and coaxially positioned at its other end with the open end of said die; spring and disk means within said body, said spring being compressed by hay ejected from said die into said body; a control valve mounted on said tubular body opposite the hay wafer receiving end; a valve control rod axially disposed within said body and connected with said control valve and actuated by the compression of said spring and disk means; an air cylinder connected to said harvester, said cylinder having an extendable shaft connected to said body adjacent said die; air lines connecting said cylinder and said control valve with a source of compressed air, said cylinder being actuated by the opening and closing of said control valve for pivoting the free end portion of said body laterally of said die by the movement of said control rod and permitting expansion of said spring to eject the hay wafer; and a laterally extending die plate connected with the free end of said body and slidably connected with the free end of said die for closing the open end of the latter while the wafer is being ejected from said body by the expansion of said spring.

7. Structure as specified in claim 6 in which the spring and disk means includes a centrally apertured partition within said body intermediate its ends, a pressure plate axially connected with said control rod within said body adjacent its hay receiving end, said spring comprising a helical spring interposed between said partition and said pressure plate around said control rod, and a disk axially secured to said control rod on that side of said partition opposite said pressure plate for limiting the expansive movement of said spring.

8. In an apparatus for making compressed hay wafers, said apparatus being of the type having an axially open elongated die cell including axially spaced entrance and exit ends with the entrance end thereof arranged adjacent a rotary compression means for applying force to hay disposed opposite the entrance end of said die cell to compress a column of hay into and through said die cell; the improvement comprising means axially engageable with the column of hay emerging from the exit end of the die cell to axially compact said column and form the latter into a compressed wafer of hay as said force is applied, said means axially engageable with the column of hay comprising a compaction plunger reciprocably mounted axially opposite the exit end of the die cell and engageable with the column of hay emerging therefrom, yieldable spring means continuously urging said plunger into engagement with said column of hay and being yieldable in response to movement of said column through said die cell as said force is applied, and means mounting said compaction plunger for pivotal movement out of axial alignment with the exit end of said die cell in response to a predetermined amount of yielding of said spring means to break and eject wafers of substantially uniform length from said column.

References Cited by the Examiner

UNITED STATES PATENTS

| | | |
|---|---|---|
| 752,644 | 2/1904 | Benson et al. |
| 2,522,800 | 9/1950 | Quiroz _____ 100—218 X |
| 3,017,730 | 1/1962 | Rodish _____ 100—218 X |
| 3,070,003 | 12/1962 | Stacy _____ 100—218 X |

FOREIGN PATENTS

| | | |
|---|---|---|
| 1,120,157 | 4/1956 | France. |
| 86,053 | 8/1957 | Netherlands. |

LOUIS O. MAASSEL, *Primary Examiner.*

WALTER A. SCHEEL, *Examiner.*

B. J. WILHITE, *Assistant Examiner.*